(12) United States Patent
Fukinuki et al.

(10) Patent No.: US 12,226,887 B2
(45) Date of Patent: Feb. 18, 2025

(54) POWER TOOL

(71) Applicant: Nanjing Chervon Industry Co., Ltd., Nanjing (CN)

(72) Inventors: Masatoshi Fukinuki, Nanjing (CN); Guoming Tong, Nanjing (CN); Rui Zhan, Nanjing (CN); Xiang Zhao, Nanjing (CN); Pengpeng Xue, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 57 days.

(21) Appl. No.: 18/176,896

(22) Filed: Mar. 1, 2023

(65) Prior Publication Data

US 2023/0202020 A1 Jun. 29, 2023

Related U.S. Application Data

(63) Continuation of application No. PCT/CN2021/116624, filed on Sep. 6, 2021.

(30) Foreign Application Priority Data

Sep. 4, 2020 (CN) .......................... 202010922861.0
Dec. 9, 2020 (CN) .......................... 202011425115.7
(Continued)

(51) Int. Cl.
*B25F 5/00* (2006.01)
*H02K 5/20* (2006.01)
(Continued)

(52) U.S. Cl.
CPC ............ *B25F 5/008* (2013.01); *H02K 5/207* (2021.01); *H02K 5/225* (2013.01); *H02K 7/145* (2013.01);
(Continued)

(58) Field of Classification Search
CPC ......... B24B 55/00; B24B 23/02; B24B 23/04; B25F 5/008; B25F 5/021; B25F 5/006;
(Continued)

(56) References Cited

U.S. PATENT DOCUMENTS 5,027,910 A * 7/1991 Honsa ................ B25F 5/006
173/162.1
2014/0068952 A1* 3/2014 Soreo ................ B23D 51/16
173/214

(Continued)

FOREIGN PATENT DOCUMENTS

CN 202592349 U 12/2012
CN 202656162 U 1/2013
(Continued)

OTHER PUBLICATIONS

Translation of CN-109525070-A (Year: 2019).*
(Continued)

*Primary Examiner* — Thomas M Wittenschlaeger
(74) *Attorney, Agent, or Firm* — Greenberg Traurig, LLP

(57) ABSTRACT

A power tool includes a power mechanism including a drive shaft; an oscillating mechanism; an airflow element connected to the drive shaft; a heat conducting portion supported on the drive shaft, where the airflow element is disposed on the heat conducting portion. The oscillating mechanism includes a support assembly sleeved on the drive shaft and an oscillating member. Heat generated by the oscillating mechanism is conducted to the heat conducting portion through the drive shaft, the heat conducting portion has a thermal conductivity greater than or equal to 50 W/m·° C., and a ratio of an axial distance L1 of a portion of the heat conducting portion in contact with the drive shaft to a distance L2 of a thermally conductive portion of the drive shaft between the heat conducting portion and the support (Continued)

assembly is greater than or equal to 0.1 and less than or equal to 5.

18 Claims, 13 Drawing Sheets

(30) Foreign Application Priority Data

Aug. 25, 2021 (CN) .......................... 202110982603.6
Aug. 25, 2021 (CN) .......................... 202122021246.5

(51) Int. Cl.
  *H02K 5/22* (2006.01)
  *H02K 7/14* (2006.01)
  *H02K 9/06* (2006.01)
  *B25F 3/00* (2006.01)

(52) U.S. Cl.
  CPC .................. *H02K 9/06* (2013.01); *B25F 3/00* (2013.01); *B25F 5/006* (2013.01)

(58) Field of Classification Search
  CPC ........... B25F 3/00; B27B 23/00; H02K 9/227; H02K 9/06; H02K 7/145; H02K 5/225; H02K 5/207; H02K 2213/03
  See application file for complete search history.

(56) References Cited

U.S. PATENT DOCUMENTS

| | | | |
|---|---|---|---|
| 2019/0099873 A1* | 4/2019 | Zhang | H02K 7/145 |
| 2023/0166378 A1* | 6/2023 | Miyazawa | B24B 23/028 |

FOREIGN PATENT DOCUMENTS

| | | | | |
|---|---|---|---|---|
| CN | 206200902 U | | 5/2017 | |
| CN | 107009327 A | | 8/2017 | |
| CN | 109525070 A | * | 3/2019 | ............ H02K 11/22 |
| CN | 110653699 A | | 1/2020 | |
| EP | 2823938 A1 | | 1/2015 | |
| IN | 202656162 U | | 1/2013 | |
| WO | WO-2020250694 A1 | * | 12/2020 | |

OTHER PUBLICATIONS

Translation of WO 2020250694 A1 (Year: 2020).*
ISA/CN, Int. Search Report issued on PCT application No. PCT/CN2021/116624, dated Nov. 25, 2021, 3 pages.
ISA/CN, English translation of Int. Search Report issued on PCT application No. PCT/CN2021/116624, dated Nov. 25, 2021, 2 pages.
ISA/CN, Written Opinion issued on PCT application No. PCT/CN2021/116624, dated Nov. 25, 2021, 3 pages.
ISA/CN, English translation of Written Opinion issued on PCT application No. PCT/CN2021/116624, dated Nov. 25, 2021, 3 pages.

* cited by examiner

POWER TOOL

RELATED APPLICATION INFORMATION

This application is a continuation of International Application Number PCT/CN2021/116624, filed on Sep. 6, 2021, through which this application also claims the benefit under 35 U.S.C. § 119 (a) of Chinese Patent Application No. 202010922861.0, filed on Sep. 4, 2020, Chinese Patent Application No. 202011425115.7, filed on Dec. 9, 2020, Chinese Patent Application No. 202110982603.6, filed on Aug. 25, 2021, and Chinese Patent Application No. 202122021246.5, filed on Aug. 25, 2021, which applications are incorporated herein by reference in their entirety.

BACKGROUND

As a power tool, an oscillating multifunctional tool generally drives the oscillation of a work attachment through an oscillating member so as to perform cutting, grinding, and other operations on an object. The high-frequency vibration of the oscillating member generally causes the heat concentration of the oscillating member, accelerating the failure of the oscillating member and resulting in the failure of the whole machine. Therefore, due to the limitation of the service life of the oscillating member to an existing oscillating multifunctional tool, the oscillation angle and output speed of the oscillating power tool cannot be further increased, limiting the increase of the cutting speed and cutting power of the oscillating power tool. Therefore, how to improve the efficiency and power of the oscillating multifunctional tool without sacrificing the service life of the whole machine becomes a technical problem to be solved urgently in the art.

SUMMARY

A power tool includes: a housing extending along a front and rear direction; a power mechanism including a rotatable drive shaft; an oscillating mechanism for generating oscillations; an output mechanism including a mount drivingly connected to the oscillating mechanism; an airflow element connected to the drive shaft and driven by the drive shaft to rotate to generate a cooling airflow; an air inlet disposed on the housing and allowing the cooling airflow to enter; an air outlet disposed on the housing and downstream of the air inlet and allowing the cooling airflow to flow out; and a heat conducting portion supported on the drive shaft, where the airflow element is disposed on an outer circumference of the heat conducting portion. The oscillating mechanism includes a support assembly sleeved on the drive shaft and an oscillating member configured to be capable of being driven by the support assembly to oscillate. Heat generated by the oscillating mechanism is conducted to the heat conducting portion through the drive shaft, and the heat conducting portion has a thermal conductivity greater than or equal to 50 W/m·° C.

In some examples, the power mechanism further includes a flow restricting mechanism disposed within the housing and upstream of the airflow element, where the flow restricting mechanism is filled between an inner wall of the housing and the power mechanism to block an upstream backflow of the cooling airflow.

In some examples, the power mechanism includes a power housing, and the flow restricting mechanism is filled between an outer circumference of the power housing and the inner wall of the housing.

In some examples, the flow restricting mechanism is a flexible element.

In some examples, a groove and/or a rib plate for positioning the flow restricting mechanism are provided on the inner wall of the housing and/or on the power housing.

In some examples, the flow restricting mechanism is a sponge pad or a rubber pad; and the flow restricting mechanism is fixed to an outer circumferential surface of the power housing.

In some examples, the flow restricting mechanism includes multiple annular ribs formed on the inner wall of the housing and/or on the power housing.

In some examples, a shock absorbing mechanism is disposed between the power housing and the housing.

In some examples, the shock absorbing mechanism includes multiple damping assemblies in different dimensions, where the multiple damping assemblies separately surround the power housing and are used for separately damping forces in different directions.

In some examples, the shock absorbing mechanism includes a first-dimensional damping assembly and a second-dimensional damping assembly that are disposed on a transmission housing substantially along directions perpendicular to each other; where the first-dimensional damping assembly and the second-dimensional damping assembly are disposed on an outer circumference of a motor housing, and the second-dimensional damping assembly is disposed on an outer circumference of the transmission housing.

In some examples, the first-dimensional damping assembly and the second-dimensional damping assembly each include a shock absorbing damper; and at least the first-dimensional damping assembly further includes a buffer damper.

In some examples, a portion of the heat conducting portion in contact with the drive shaft has an axial distance L1, and a thermally conductive portion of the drive shaft between the heat conducting portion and the support assembly has a distance L2, where a ratio of the axial distance L1 to the distance L2 is greater than or equal to 0.1 and less than or equal to 5.

A power tool includes: a housing extending along a front and rear direction; a power mechanism including a motor housing and a motor disposed within the motor housing, where the motor includes a rotatable drive shaft; an oscillating mechanism for generating oscillations; an output mechanism including a mount drivingly connected to an oscillating member; and a work attachment selectively connected to the mount. The oscillating mechanism includes a transmission housing connected to the motor housing; a support assembly sleeved on the drive shaft; and the oscillating member supported on the support assembly and driven by the support assembly to polarize. The motor housing further includes a lead securing mechanism, where the lead securing mechanism includes a lead securing portion for securing leads.

In some examples, a lead channel allowing motor wires to penetrate through is formed in the lead securing portion.

In some examples, the lead channel extends from an axial end of the motor.

In some examples, the lead securing mechanism further includes an internal shock absorber that allows wires to penetrate through and is embedded in the lead channel.

In some examples, the lead securing mechanism further includes an external shock absorbing assembly, where the external shock absorbing assembly includes multiple damping assemblies in different dimensions, and the multiple damping assemblies separately surround an outer circumference of the lead securing portion and are used for separately damping forces in different directions.

In some examples, the external shock absorbing assembly includes a first-dimensional damping assembly and a second-dimensional damping assembly that are disposed on the transmission housing substantially along directions perpendicular to each other.

In some examples, the first-dimensional damping assembly and the second-dimensional damping assembly each include a shock absorbing damper; and at least the first-dimensional damping assembly further includes a buffer damper, where the shock absorbing damper and the buffer damper are made of different materials.

In some examples, the lead securing mechanism further includes an end fixing member fixed to an axial end of the lead securing portion.

In some examples, the power tool further includes a heat conduction and dissipation mechanism, where the heat conduction and dissipation mechanism includes a heat conducting portion supported on the drive shaft and an airflow element rotating with the drive shaft to generate an airflow; where at least the heat conducting portion is made of metal, and heat generated by the oscillating mechanism is conducted to the heat conduction and dissipation mechanism through the drive shaft.

In some examples, a portion of the heat conducting portion in contact with the drive shaft has an axial distance L1, and a thermally conductive portion of the drive shaft between the heat conducting portion and the support assembly has a distance L2, where a ratio of the axial distance L1 to the distance L2 is greater than or equal to 0.1 and less than or equal to 5.

In some examples, the heat conduction and dissipation mechanism has a density of 2.70 g/cm$^3$.

A power tool includes: a housing extending along a front and rear direction; a power mechanism including a rotatable drive shaft; an oscillating mechanism used for generating oscillations and including a transmission housing; an output mechanism including a mount drivingly connected to the oscillating mechanism; a work attachment selectively connected to the mount; a fitting including a tool portion and an operating portion; and a fitting clamp, where the fitting clamp includes a clamp body detachably connected to the transmission housing; a fitting mounting portion disposed on the clamp body and suitable for fixing the operating portion; and a fastening assembly suitable for locking and fixing the clamp body, where the fastening assembly includes a retaining member for locking and fixing the clamp body, where the retaining member includes a torque transmission hole into which an end of the operating portion is inserted to perform locking and unlocking operations, where the torque transmission hole is a non-circular hole.

In some examples, the torque transmission hole includes at least a straight side for transmitting torque, and the operating portion includes a torque transmission plane mating with the straight side.

In some examples, the fitting mounting portion includes a through hole disposed on the clamp body and a fixing member suitable for being connected to the through hole, the fixing member fixedly locks the operating portion in the through hole, and the operating portion further includes a locking plane mating with the fixing member to lock the operating portion.

In some examples, the operating portion is a hexagonal prism and the retaining member is a socket head cap screw.

In some examples, the fitting includes a depth gauge and/or a guide gauge.

In some examples, the fitting clamp further includes limiting members disposed on an inner circumferential surface of the clamp body, and the transmission housing includes positioning grooves allowing the limiting members to axially enter and exit.

In some examples, the fitting clamp further includes multiple diagonal members disposed on the inner circumferential surface of the clamp body, where the diagonal members are used for identifying an installation angle of the fitting clamp.

In some examples, the power tool further includes a heat conduction and dissipation mechanism, where the heat conduction and dissipation mechanism includes a heat conducting portion supported on the drive shaft and an airflow element rotating with the drive shaft to generate an airflow; where at least the heat conducting portion is made of metal, and heat generated by the oscillating mechanism is conducted to the heat conduction and dissipation mechanism through the drive shaft.

In some examples, a portion of the heat conducting portion in contact with the drive shaft has an axial distance L1, and a thermally conductive portion of the drive shaft between the heat conducting portion and a support assembly has a distance L2, where a ratio of the axial distance L1 to the distance L2 is greater than or equal to 0.1 and less than or equal to 5.

In some examples, the power tool further includes a heat conduction and dissipation mechanism, where the heat conduction and dissipation mechanism includes a heat conducting portion supported on the drive shaft and an airflow element connected to the heat conducting portion and rotating with the drive shaft to generate an airflow. Heat generated by the oscillating mechanism is conducted to the heat conduction and dissipation mechanism through the drive shaft, and the heat conduction and dissipation mechanism has a thermal conductivity greater than or equal to 50 W/m·° C.

A power tool includes: a housing extending along a front and rear direction; a power mechanism including a motor housing and a motor disposed within the motor housing, where the motor includes a rotatable drive shaft; an oscillating mechanism for generating oscillations; an output mechanism including a mount drivingly connected to an oscillating member; and a work attachment selectively connected to the mount. The oscillating mechanism includes a transmission housing connected to the motor housing; a support assembly sleeved on the drive shaft; and the oscillating member supported on the support assembly and driven by the support assembly to polarize. The power tool further includes an oil storage unit, where the oil storage unit is disposed on the support assembly and/or the drive shaft and stores a lubricating medium.

In some examples, the oil storage unit includes an oil groove disposed on the drive shaft.

In some examples, the oil groove includes a spiral groove formed on a surface of the drive shaft and/or a linear groove formed on the surface of the drive shaft.

In some examples, the oil groove includes a core groove disposed in the drive shaft and a connecting groove disposed in the drive shaft, where the core groove communicates with an outer circumferential surface of the drive shaft through the connecting groove.

In some examples, the core groove extends along an axial direction of the drive shaft and the connecting groove extends along a radial direction of the drive shaft.

In some examples, the support assembly includes a support bracket and rolling members, where oil grooves penetrating through a circumferential surface of the support bracket are provided on the support bracket.

In some examples, the power tool further includes a heat conduction and dissipation mechanism, where the heat conduction and dissipation mechanism includes a heat conducting portion supported on the drive shaft and an airflow element rotating with the drive shaft to generate an airflow; where at least the heat conducting portion is made of metal, and heat generated by the oscillating mechanism is conducted to the heat conduction and dissipation mechanism through the drive shaft.

In some examples, a portion of the heat conducting portion in contact with the drive shaft has an axial distance L1, and a thermally conductive portion of the drive shaft between the heat conducting portion and the support assembly has a distance L2, where a ratio of the axial distance L1 to the distance L2 is greater than or equal to 0.1 and less than or equal to 5.

In some examples, the power tool further includes a heat conduction and dissipation mechanism, where the heat conduction and dissipation mechanism includes a heat conducting portion supported on the drive shaft and an airflow element connected to the heat conducting portion and rotating with the drive shaft to generate an airflow. Heat generated by the oscillating mechanism is conducted to the heat conduction and dissipation mechanism through the drive shaft, and the heat conduction and dissipation mechanism has a thermal conductivity greater than or equal to 50 W/m·° C.

In some examples, the output mechanism further includes an output shaft connected to the oscillating member, the mount is disposed on the output shaft, and the output shaft has an oscillation angle $\alpha$ centered on an axis of the output shaft, where the oscillation angle $\alpha$ is greater than or equal to 3°; and the motor has a rotational speed greater than or equal to 15000 rpm.

DETAILED DESCRIPTION

Figure 1:
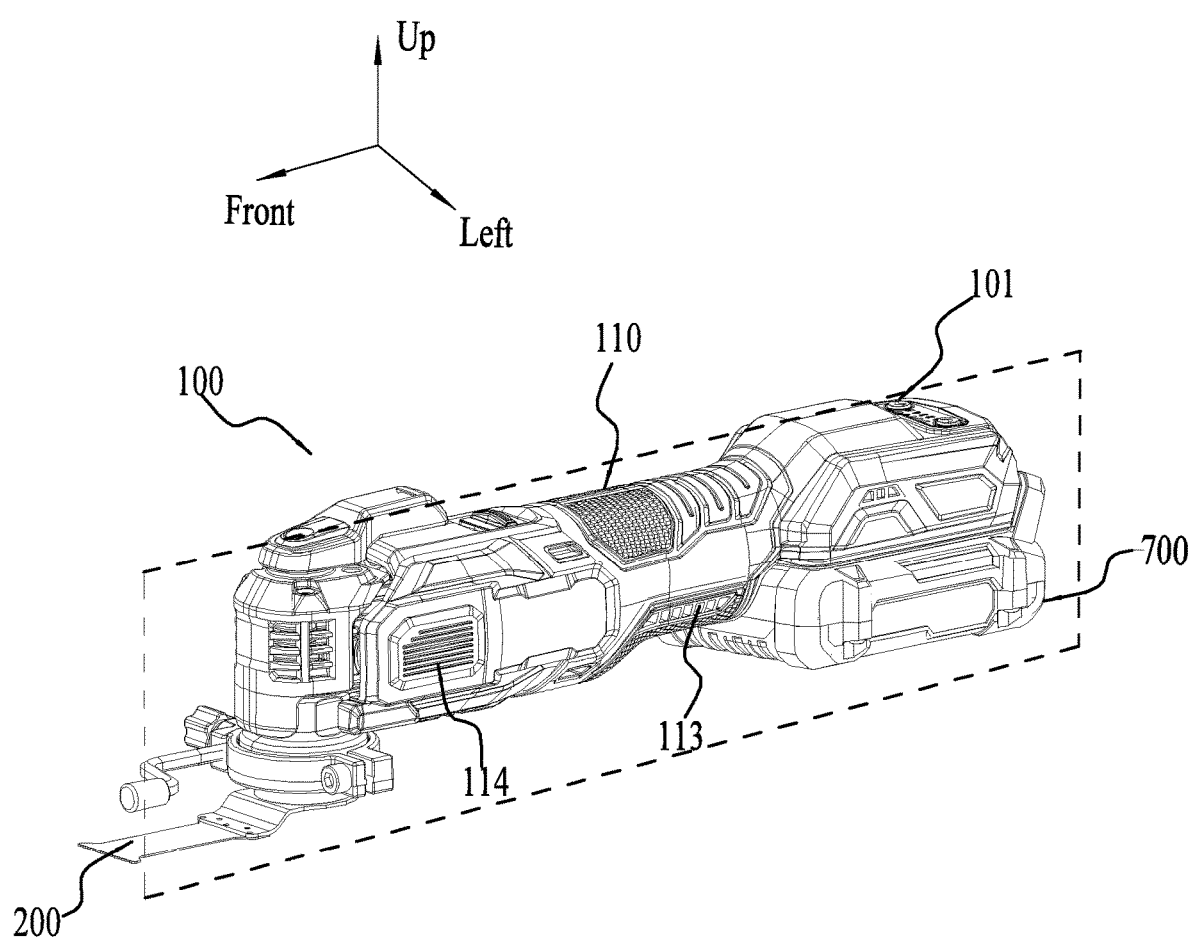
FIG. 1 is a structural view of a power tool in the present disclosure.

As shown in FIG. 1, a power tool 100 in the present disclosure may be a hand-held oscillating power tool, such as an oscillating multifunctional tool, where the power tool 100 includes multiple work attachments 200, such as a blade, a triangular sander, a metal saw blade, a woodworking saw blade, and a silicon carbide saw blade. Through these different work attachments 200, the power tool 100 can implement functions such as sawing, sanding, filing, and scraping.

The power tool 100 in the present disclosure includes a tool body 100*a*. The tool body 100*a* includes a housing 110, a power mechanism 300, an oscillating mechanism 400, an output mechanism 500, a heat conduction and dissipation mechanism 600, and a power source. The power source in the present disclosure is a battery pack 700. In other examples, the power source may include a plug and a cable of external mains power.

Figure 2:
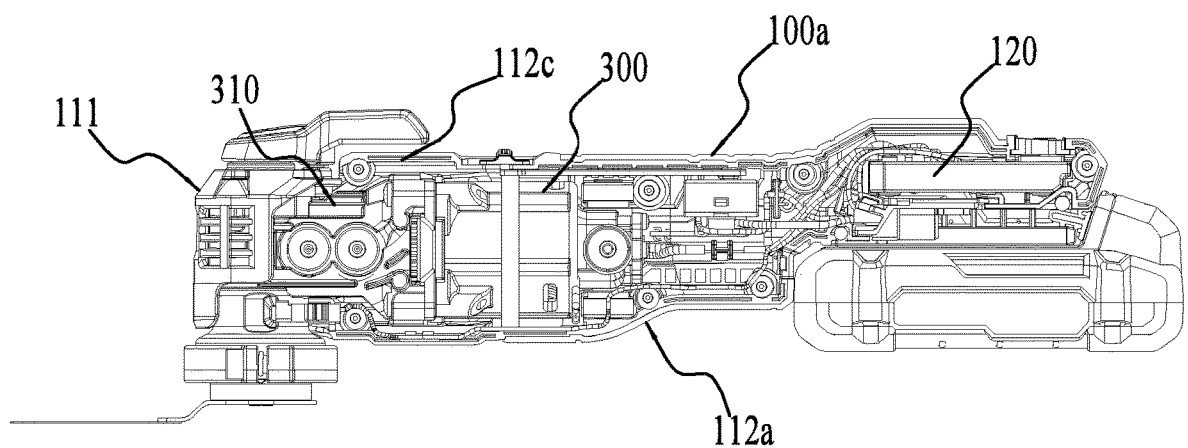
FIG. 2 is a structural view of the power tool in FIG. 1 with a left housing opened.
Figure 3:
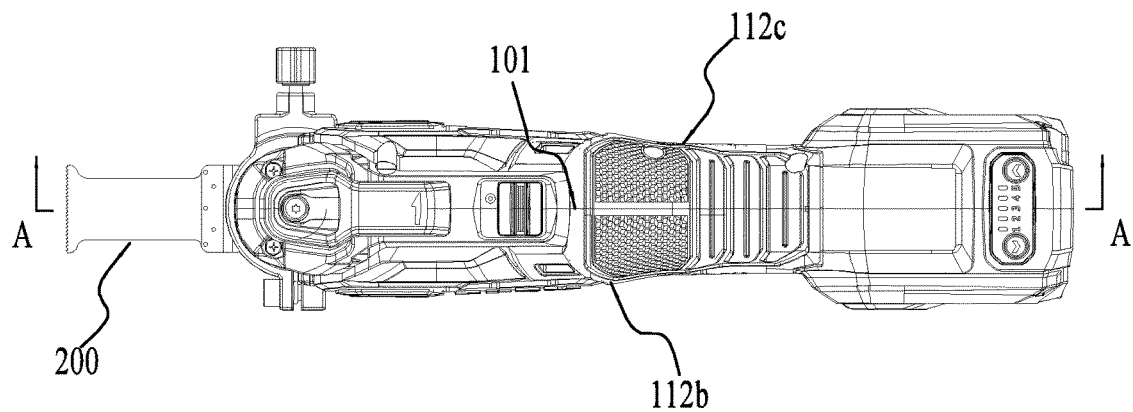
FIG. 3 is a top view of the power tool in FIG. 1.

As shown in FIGS. 2 and 3, the housing 110 includes a first housing 111 and a second housing 112, where the first housing 111 and the second housing 112 together form the housing of the tool, and the second housing 112 is formed with a grip 112*a* for a user to hold. The first housing 111 may partially extend into the second housing 112 so that the first housing 111 and the second housing 112 are combined into a whole. The first housing 111 may not extend into the second housing 112, and the first housing 111 and the second housing 112 may be connected into a whole through other connecting components such as screws.

The power mechanism 300 in the example of the present disclosure includes a power housing, where the power housing includes a motor housing 340 and a transmission housing 310, where the oscillating mechanism 400 and the output mechanism 500 are accommodated in the transmission housing 310, and a motor 320 and a motor shaft configured to be a drive shaft 330 are accommodated in the motor housing 340.

The transmission housing 310 is at least partially coated by the first housing 111 and extends from the first housing 111 into the second housing 112.

The second housing 112 may specifically include a left housing 112*b* and a right housing 112*c*, where the left housing 112*b* and the right housing 112*c* may be basically symmetrical about a middle plane 101 as shown in FIGS. 1 and 3 so that a grip 112*a* formed by the left housing 112*b* and the right housing 112c is also basically symmetrical about the middle plane 101, and the first housing 111 is also basically symmetrical about the middle plane 101.

The motor housing 340 is disposed in the second housing 112, and the motor shaft extends into the transmission housing 310 and is connected to the oscillating mechanism 400. The motor shaft is an eccentric shaft and includes a first shaft portion 331 and a second shaft portion 332. A centerline of the second shaft portion 332 is spaced apart from a centerline of the first shaft portion 331 by an equal distance, the first shaft portion 331 is drivingly connected to the oscillating mechanism 400, and the second shaft portion 332 is connected to the heat conduction and dissipation mechanism 600. In another example, the drive shaft 330 may be connected to the motor shaft through a conventional transmission mechanism, where the drive shaft 330 is an eccentric shaft.

Figure 23:
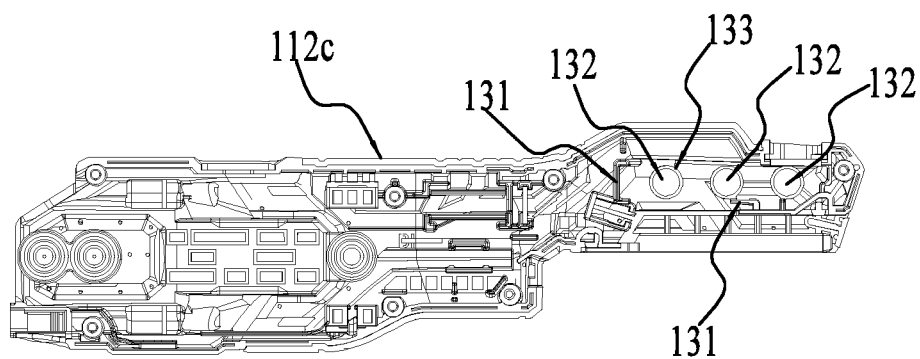
FIG. 23 is a structural view of a right housing.

The motor 320 further includes a motor control unit. Specifically, referring to FIGS. 7 and 8, the motor control unit includes a control circuit board assembly 322, where the control circuit board assembly 322 is connected to the motor through leads on the one hand and electrically connected to a main control assembly 120 of the whole machine shown in FIG. 2 through motor wires 321 on the other hand. The control circuit board assembly 322 is disposed at an axial end of the motor 320, and the motor wires 321 are led out from the control circuit board assembly 322 and connected to the main control assembly 120. The main control assembly 120 of the whole machine in the example of the present disclosure is also a circuit board assembly, where a shock absorber for the main control assembly is provided between the main control assembly 120 and a housing 110 and used for damping the vibration of the main control assembly. Specifically, the shock absorber may include one or more of an elastic shock absorber and a shock absorbing rib disposed in the housing 110. As shown in FIG. 23, the shock absorber in the example of the present disclosure includes shock absorbing ribs 131 provided around the main control assembly 120, where the shock absorbing ribs 131 may be integrally formed with the housing 110. The shock absorber further includes elastic shock absorbers 132 provided on the left and right sides of the main control assembly. Specifically, a hollow annular mounting seat 133 is formed on the inner wall of the housing 110, where the mounting seat 133 may be a plastic piece integrally formed with the housing 110, the elastic shock absorbers 132 are disposed in the mounting seat 133, and the elastic shock absorbers 132 are integrally injection-molded in the mounting seat 133 through the soft rubber covering the outside of the housing 110. The elastic shock absorber 132 may be a separate elastic member such as a rubber ring or a rubber pad, which is not limited here.

As an alternative example, the elastic shock absorbers may be provided around the main control assembly 120 in addition to the left and right direction of the main control assembly 120.

The motor wires 321 move relative to the control circuit board assembly 322 due to the vibration of the power tool in a running process, causing a connection failure of the motor wires 321. To avoid the connection failure, the motor housing 340 in this example further includes a lead securing mechanism 340a, where the lead securing mechanism 340a includes a lead securing portion 341 and an internal shock absorber 350.

Figure 7:
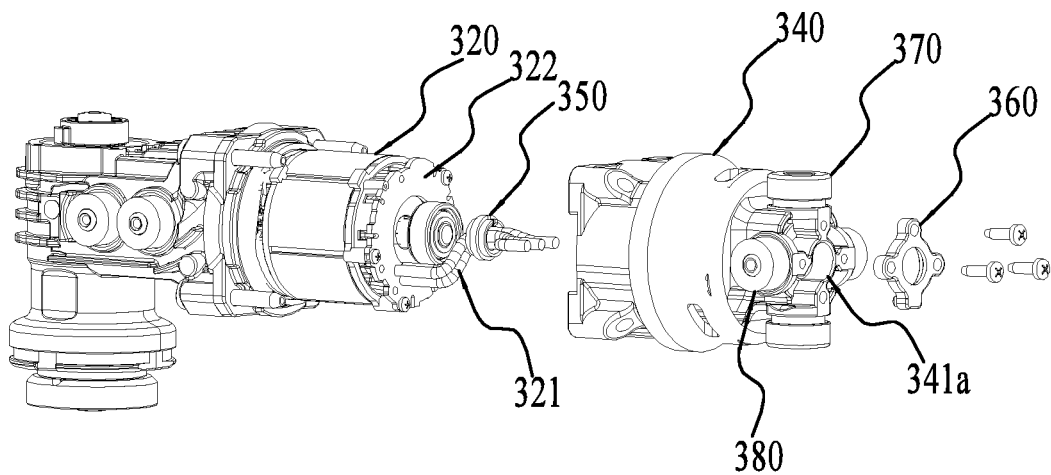
FIG. 7 is a schematic view of the assembly of a motor housing of the power tool in FIG. 5.

As shown in FIG. 7, the lead securing portion 341 is used for securing leads and disposed at an axial end of the motor housing 340 facing away from the oscillating mechanism 400. Specifically, the lead securing portion 341 is an annular boss formed at the axial end of the motor housing 340, a lead channel 341a allowing the motor wires 321 to penetrate through is formed in the lead securing portion 341, and the lead channel 341a extends along a direction parallel to a motor axis. The lead securing portion may be disposed at another position of the motor housing, which is not limited here.

Figure 8:
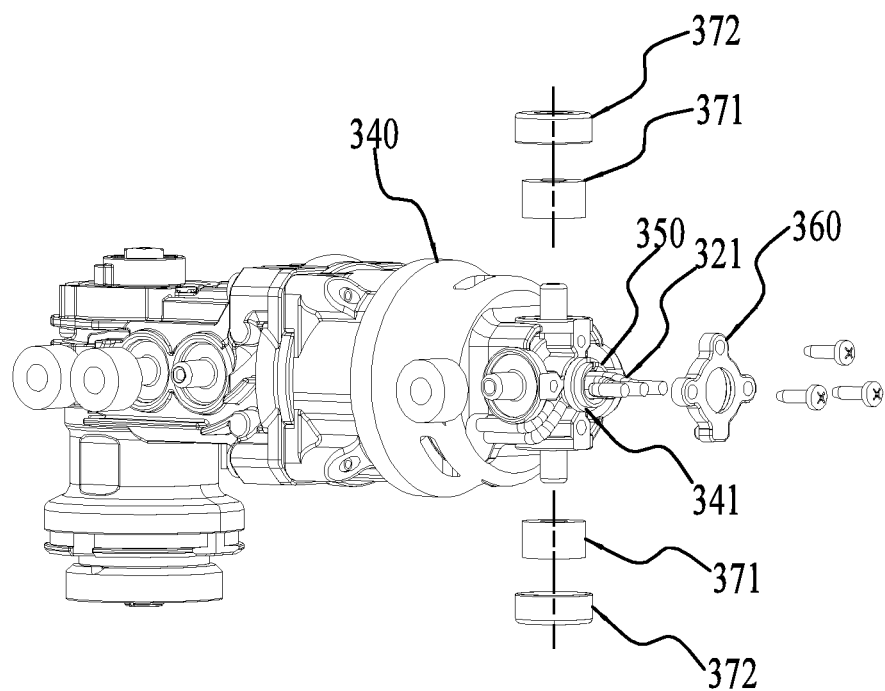
FIG. 8 is a schematic view of the assembly of a lead securing mechanism of the power tool in FIG. 7.

As shown in FIG. 8, the internal shock absorber 350 is embedded in the lead channel 341a. Specifically, the internal shock absorber 350 is an annular damper such as an annular rubber ring, and the internal shock absorber 350 is clamped in the lead channel 341a of the lead securing portion 341. The lead channel 341a parallel to the direction of the motor axis is provided so that a lead-out direction of the motor wires 321 is substantially parallel to the motor axis. At the same time, the internal shock absorber 350 for shock absorbing is provided in the lead channel 341a so that the movement of the motor wires 321 relative to the control circuit board assembly 322 can be effectively buffered.

As shown in FIGS. 7 and 8, the lead securing mechanism 340a further includes an end fixing member 360 fixed to an axial end of the lead securing portion 341. Specifically, the end fixing member 360 is a fixing plate provided with a through hole at the center of the end fixing member 360, where the through hole at the center is used for the motor wires 321 to penetrate through, mounting holes are provided around the fixing plate, corresponding mounting holes are provided at the axial end of the corresponding annular boss forming the lead securing portion 341, and the end fixing member 360 is fixed to the lead securing portion 341 by fixing members such as screws. The end fixing member 360 is used for limiting and fixing the internal shock absorber, further ensuring the reliability of the internal shock absorber.

Figure 4:
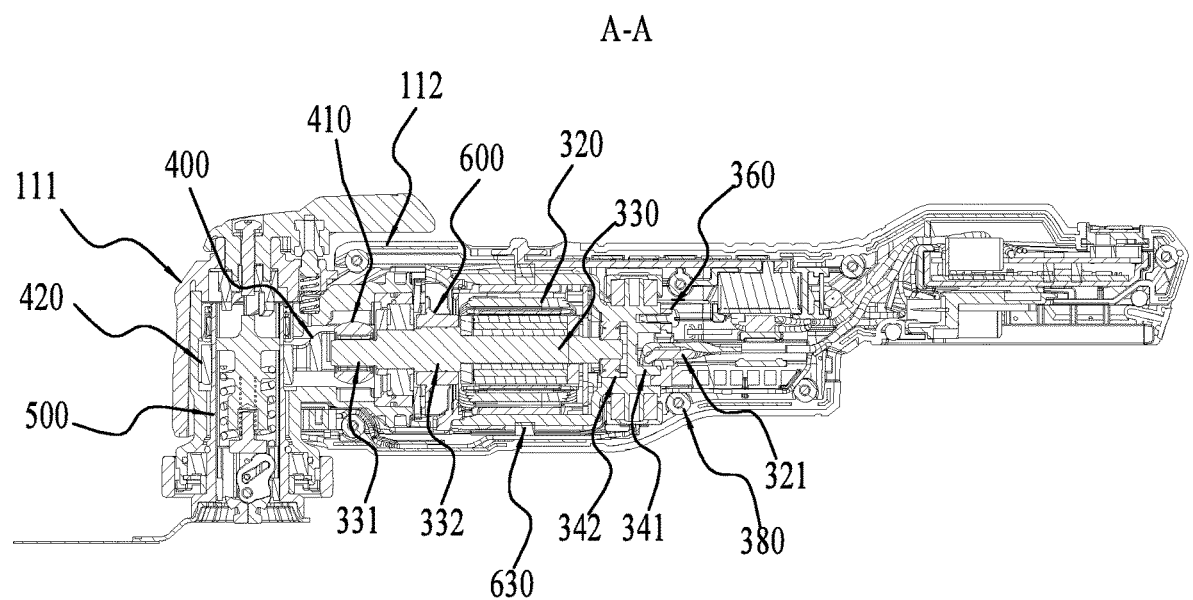
FIG. 4 is a sectional view taken along A-A in FIG. 3.

As shown in FIG. 4, a support cavity 342 is provided on the inner side of the motor housing 340 and used for mounting a bearing supporting the drive shaft 330 of the motor.

Figure 9:
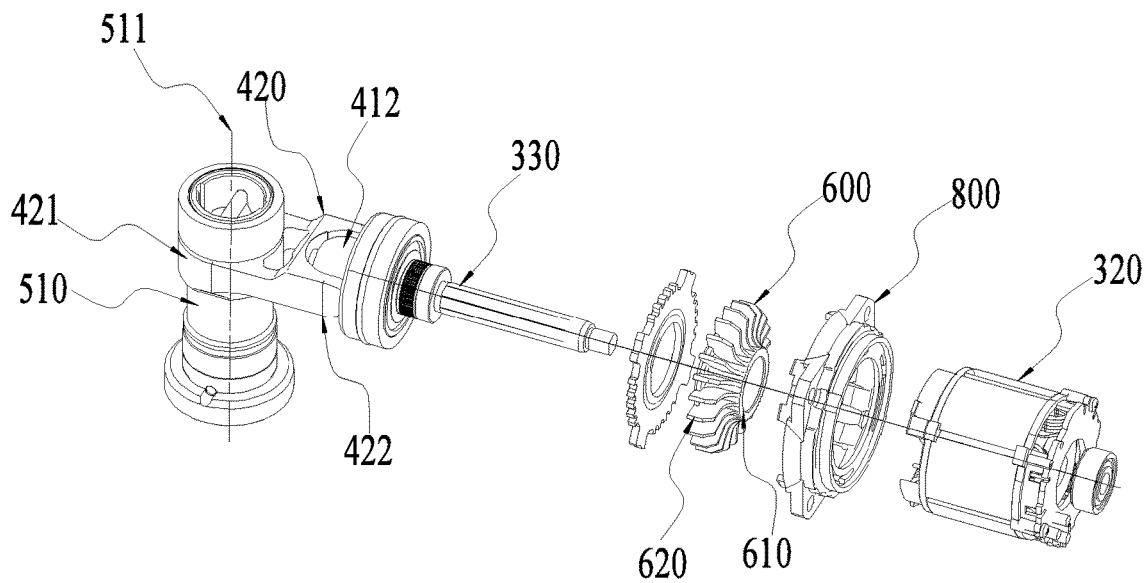
FIG. 9 is a schematic view of the assembly of an output shaft, an oscillating mechanism, and a power mechanism in the present disclosure.
Figure 10:
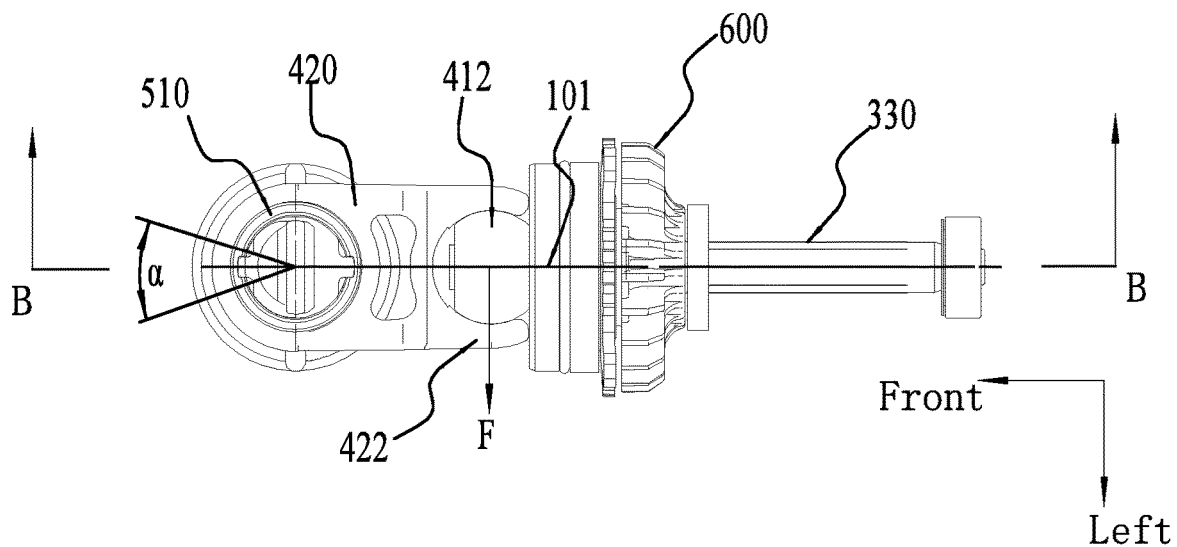
FIG. 10 is a schematic view of the assembly of an oscillating mechanism and a motor shaft in the present disclosure.
Figure 11:
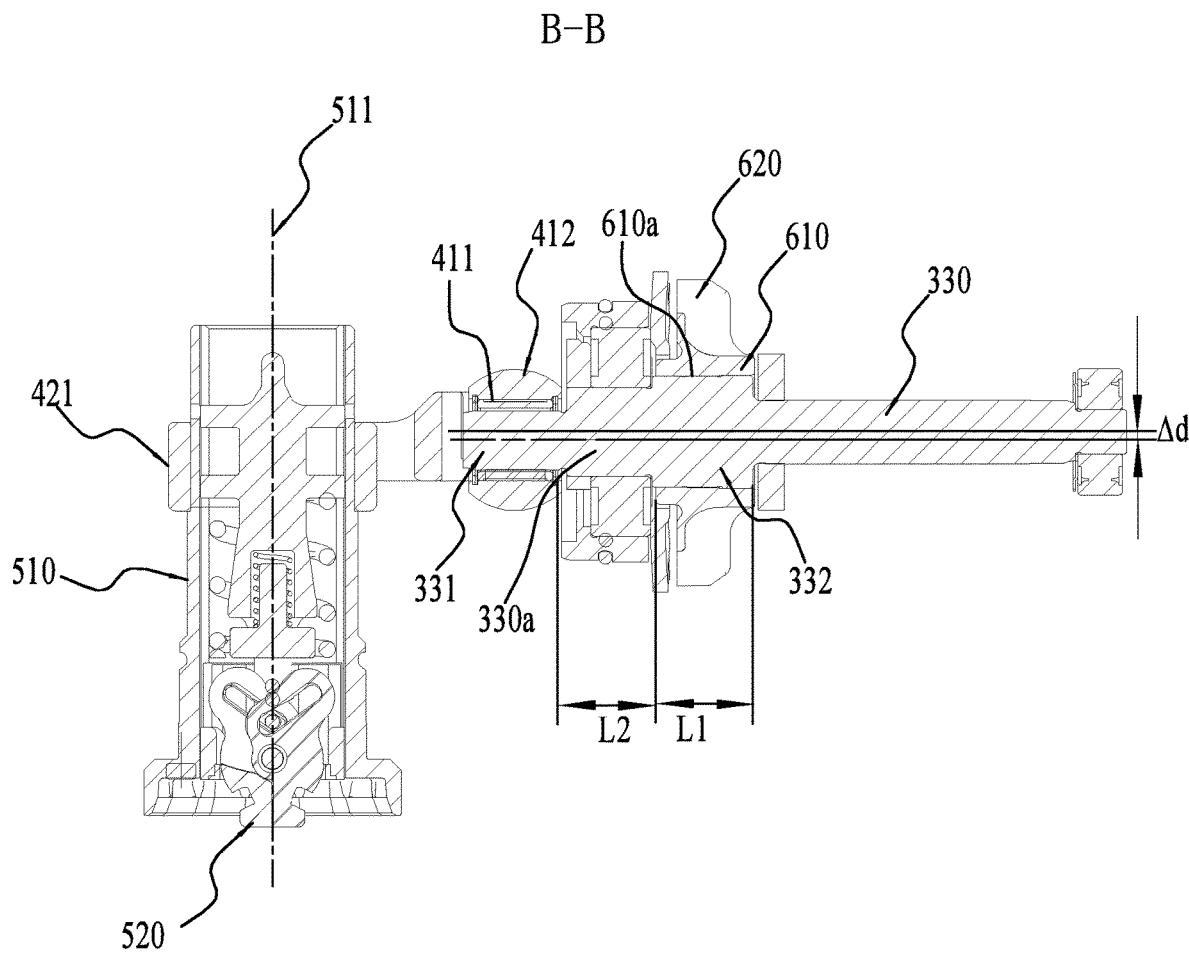
FIG. 11 is a sectional view taken along B-B in FIG. 10.

The oscillating mechanism 400 in this example is used for directly generating vibration. The oscillating mechanism 400 includes a support assembly 410 and an oscillating member, where the oscillating member is specifically a shift fork 420. Specifically, as shown in FIGS. 9 to 11, the support assembly in this example includes a bearing 411 and a ball sleeve 412, where the ball sleeve 412 is sleeved on the first shaft portion 331 of the motor shaft 330 through the bearing 411. When the second shaft portion 332 rotates with the motor shaft 330, the bearing 411 is driven by the first shaft portion 331 to reciprocate left and right in the left and right direction perpendicular to the middle plane 101. The bearing 411 in this example is a double row ball bearing to improve the strength with which the oscillating member is supported.

As shown in FIGS. 9 and 10, the ball sleeve 412 is sleeved on an outer circumference of the bearing 411 and is rollably connected to the bearing 411. It is to be understood that the bearing 411 is a ball bearing or a roller bearing, where balls or rollers are provided on a retainer of the bearing, and the ball sleeve 412 is sleeved on the outer circumference of the bearing 411, where the balls or rollers are supported and roll between the motor shaft and the ball sleeve. The ball sleeve 412 has a partial outer circular surface, and the oscillating member includes a partial inner circumferential surface mating with the ball sleeve 412, where the partial inner circumferential surface of the oscillating member is sleeved on the partial outer circular surface and the oscillating member can be driven by the ball sleeve 412 to move.

Referring to FIGS. 18 to 22, in the example of the present disclosure, the oscillating mechanism 400 of the power tool further includes an oil storage unit 431 disposed on the support assembly 410 and/or the drive shaft 330 and used for storing a lubricating medium such as lubricating oil. The oil storage unit 431 stores the lubricating medium so as to reduce heat generated during the running of the power tool.

Figure 19:
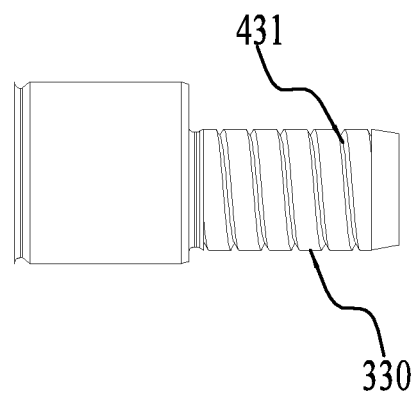
FIG. 19 is a structural view of an oil storage unit in another example of a power tool in the present disclosure.

The oil storage unit 431 includes an oil groove disposed on the drive shaft 330. Referring to FIG. 19, the drive shaft 330 in the example of the present disclosure may be the motor shaft 330. Specifically, as shown in FIG. 19, the oil groove may include a spiral groove formed on a surface of the drive shaft 330. Alternatively, the oil groove may include a linear groove formed on the surface of the drive shaft.

Figure 20:
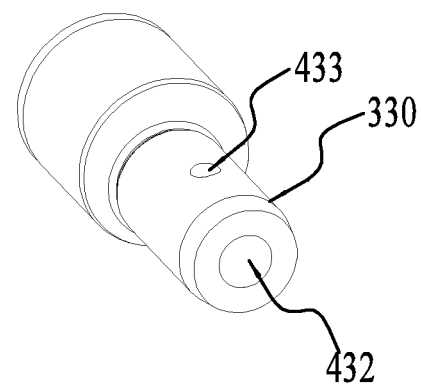
FIG. 20 is a structural view of an oil storage unit in another example of a power tool in the present disclosure.
Figure 21:
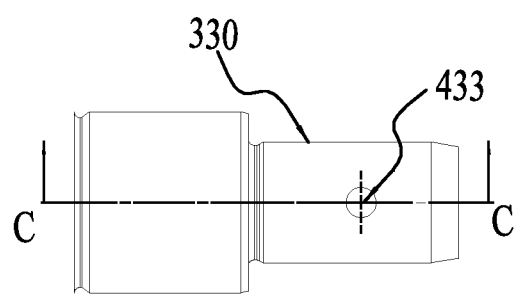
FIG. 21 is a front view of the oil storage unit shown in FIG. 20.
Figure 22:
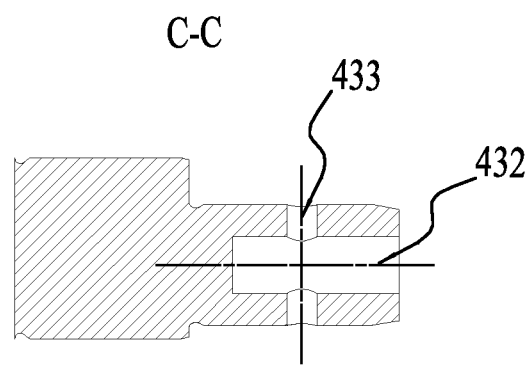
FIG. 22 is a sectional view of the oil storage unit shown in FIG. 21.

As shown in FIGS. 20 to 22, as another alternative example of the oil storage unit 431, the oil groove may further include a core groove 432 disposed in the drive shaft 330 and a connecting groove 433 disposed in the drive shaft 330, where the core groove 432 communicates with an outer circumferential surface of the drive shaft 330 through the connecting groove 433, and the connecting groove 433 is used for transmitting the lubricating oil stored in the core groove 432 to the surface of the drive shaft 330 when the drive shaft 330 rotates, thereby lubricating the bearing 411 on the surface of the drive shaft 330. Specifically, the core groove 432 extends substantially along an axial direction of the drive shaft 330 and the connecting groove 433 extends substantially along a radial direction of the drive shaft 330. The arrangement of the core groove 432 and the connecting groove 433 is not limited to this as along as the core groove is disposed inside the drive shaft 330 and the core groove communicates with the outer circumferential surface of the drive shaft 330 through the connecting groove.

Figure 18:
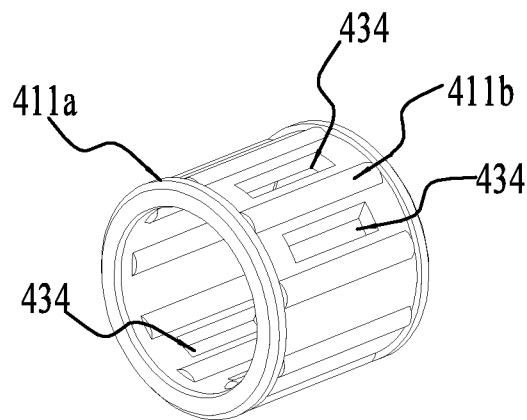
FIG. 18 is a structural view of an oil storage unit in an example of a power tool in the present disclosure.

As shown in FIG. 18, as an alternative example of the oil storage unit 431, the bearing 411 includes a support bracket 411a and rolling members 411b, where oil storage grooves 434 penetrating through a circumferential surface of the support bracket 411a are provided on the support bracket 411a. Specifically, the support bracket 411a is specifically a collar provided with openings for mounting the rolling members 411b, the support bracket 411a is used for mounting and supporting the rolling members 411b, and the rolling members 411b may be balls or rollers. Further, multiple oil storage grooves 434 penetrating through the circumferential surface of the collar is provided on the collar forming the support bracket 411a, and the lubricating oil in the oil storage grooves 434 is used for providing lubrication for the rolling members 411b.

The oil storage unit 431 is provided, which is conducive to increasing the service life of the support assembly 410, thereby increasing the service life of the whole machine.

Referring to FIG. 11, the output mechanism 500 in this example includes an output shaft 510 for outputting power, where the output shaft 510 that is not in a working state has an output shaft axis 511 substantially extending in a vertical direction. The shift fork 420, as the oscillating member, includes a mounting portion 421 and an oscillating fork 422. As shown in FIGS. 9 and 10, the oscillating fork 422 is sleeved outside the partial outer circular surface of the ball sleeve 412 and is at least rotatable relative to the ball sleeve 412, and the mounting portion 421 is a sleeve sleeved on the output shaft 510 of the output mechanism 500. Referring to FIG. 10, when the oscillating fork 422 is not in operation, two fork rods of the oscillating fork 422 are located on the left and right sides of the middle plane 101, separately. Therefore, when the ball sleeve 412 moves, the ball sleeve 412 repeatedly strikes the fork rods on the left and right sides in the left and right direction so that the oscillating fork 422 oscillates left and right, the output shaft 510 is driven by the oscillating fork 422 to oscillate within an oscillation range, and finally the work attachment 200 is driven to perform a yaw motion. It is to be understood that in this example, a direction F of an exciting force of the polarization generated by the power tool 100 in operation is basically perpendicular to the middle plane 101. In other words, the work attachment 200 vibrates in a reciprocating manner along the direction basically perpendicular to the middle plane 101.

Referring to FIG. 11, the output mechanism 500 further includes a mount 520 disposed on the output shaft 510 and drivingly connected to the shift fork 420 through the output shaft 510. Multiple work attachments 200 are selectively mounted and connected to the mount 520. The mount 520 in this example is a clamp.

The oscillating multifunctional tool in this example vibrates mainly in the following manner: the eccentric shaft drives the bearing 411 and the ball sleeve 412 to rotate and the rotating ball sleeve 412 repeatedly strikes the shift fork 420. Therefore, the whole formed by the bearing 411, the ball sleeve 412, and the shift fork 420, that is, the oscillating mechanism 400, may be considered as a vibration source.

The shift fork 420 repeatedly strikes the ball sleeve 412 during oscillations. When a rotational speed of the motor and an oscillation angle α reach certain values, heat generated by the striking is very large. However, the existing multifunctional tool cannot achieve a very good heat dissipation effect. Therefore, part of the rotational speed or part of the oscillation angle generally needs to be sacrificed, that is, a cutting speed or cutting power is sacrificed or both the cutting speed and the cutting power are reduced, so as to satisfy the requirements on the service life.

However, the multifunctional tool on the market is required to have increasingly high working power. An increase of the working power and an increase of the cutting speed correspondingly require an increase of the oscillation angle of the work attachment and an increase of the rotational speed of the motor. On the other hand, the increase of the rotational speed of the motor and the increase of the oscillation angle greatly increase the heat generated by the collision between the shift fork and the ball sleeve. Therefore, to improve the heat dissipation performance and service life of the existing oscillating power tool 100 and increase the cutting power and the cutting speed, the heat conduction and dissipation mechanism 600 is further provided in the present disclosure.

As shown in FIGS. 9 to 11, in this example, the heat conduction and dissipation mechanism 600 is supported on the second shaft portion 332 of the motor shaft, and the oscillating mechanism 400 is supported on the first shaft portion 331 of the motor shaft through the bearing 411. Referring to FIG. 11, an axis of the first shaft portion 331 and an axis of the second shaft portion 332 are arranged eccentrically. In other words, a support axis of the heat conduction and dissipation mechanism 600 and a support axis of the oscillating mechanism 400 are spaced apart from each other in parallel. In this example, the eccentricity Δd between the axis of the first shaft portion 331 and the axis of the second shaft portion 332 is substantially 1.1 mm.

The heat conduction and dissipation mechanism 600 is provided on the motor shaft for supporting the vibration source generating most heat so that the conduction and dissipation of the heat from the vibration source generating much heat are achieved, thereby further improving the service life of the power tool 100.

Referring to FIG. 11, the heat conduction and dissipation mechanism 600 includes a cylindrical heat conducting portion 610 and an airflow element 620, where the airflow element 620 is disposed on an outer circumference of the heat conducting portion 610, the heat conducting portion 610 is sleeved on the motor shaft, and the airflow element 620 rotates with the motor shaft to generate an airflow.

Referring to FIG. 1, an air inlet 113 and an air outlet 114 are further provided on the housing 110 of the power tool 100 in the present disclosure, where the air inlet 113 allows a cooling airflow to enter, and the air outlet 114 is provided downstream of the air inlet 113 and allows the cooling airflow to flow out. The airflow moves along a direction from the upstream to the downstream. It is to be understood that in this example, the upstream is substantially the rear of the body and the downstream is substantially the front of the body.

The airflow element 620 includes multiple blades formed on the heat conducting portion 610, where the housing 110 includes at least an air vent disposed in correspondence with the position of the blades. In this example, the heat conducting portion 610 is integrally formed with the airflow element 620. As an alternative example, the heat conducting portion 610 may be separately formed with the airflow element 620. In this case, the airflow element 620 includes mounting holes suitable for the airflow element 620 to be assembled and sleeved on the heat conducting portion 610. The manner in which the heat conducting portion 610 and the airflow element 620 are formed is not limited here.

The heat conduction and dissipation mechanism 600 is supported on the motor shaft, the heat generated by the oscillating mechanism 400 is conducted to the heat conduction and dissipation mechanism 600 through the motor shaft, and the heat conduction and dissipation mechanism 600 in this example is made of metal. The heat conduction and dissipation mechanism 600 has a thermal conductivity greater than or equal to 50 W/m·° C. and preferably being 96 W/m·° C. The heat conduction and dissipation mechanism 600 preferably has a density of 2.70 g/cm$^3$. In this example, the heat conduction and dissipation mechanism 600 is an aluminum die-cast, which has a superior thermal conductivity and a relatively light self-weight on the basis of satisfying the heat dissipation performance. In this example, the heat conducting portion 610 and the airflow element 620 are integrally formed, and the thermal conductivity of the heat conduction and dissipation mechanism 600 is the thermal conductivity of the heat conducting portion 610 and is also the thermal conductivity of the airflow element 620. The heat conducting portion 610 has a thermal conductivity greater than or equal to 50 W/m·° C. and the airflow element 620 has a thermal conductivity greater than or equal to 50 W/m·° C. In other examples, the heat conducting portion may be separately formed with the airflow element, and the heat conducting portion has a thermal conductivity greater than or equal to 50 W/m·° C. In other examples, the heat conducting portion may be separately formed with the airflow element, and the airflow element has a thermal conductivity greater than or equal to 50 W/m·° C.

Figure 5:
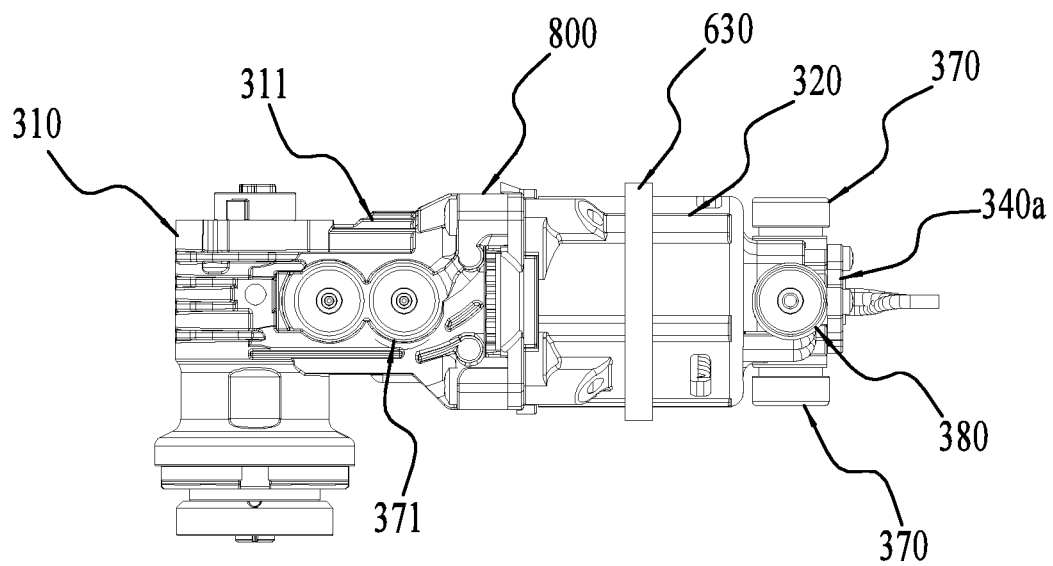
FIG. 5 is a schematic view of a power mechanism, an oscillating mechanism, and an output mechanism of a power tool in the present disclosure.
Figure 6:
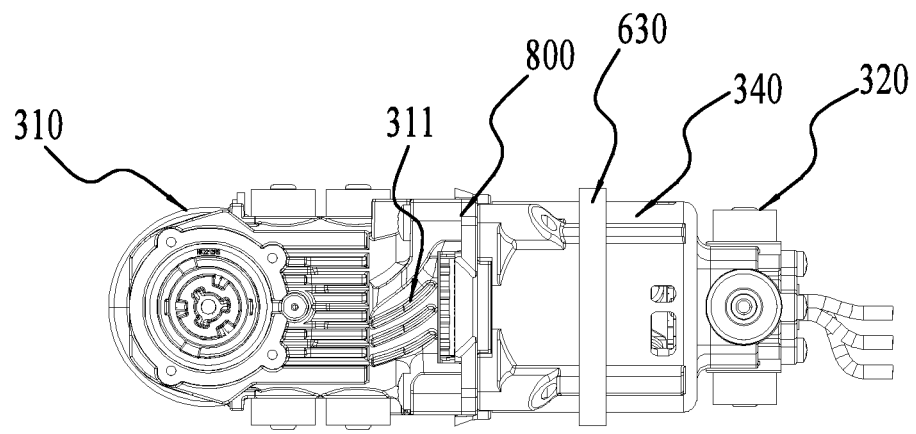
FIG. 6 is a top view of the power mechanism, the oscillating mechanism, and the output mechanism of the power tool in FIG. 5.

Further, to improve the heat dissipation effect, as shown in FIGS. 5 and 6, the power tool 100 in this example is provided with multiple guide ribs 311 on an outer circumference of the transmission housing 310, and the guide ribs 311 are provided in correspondence with the airflow element of the heat conduction and dissipation mechanism 600, which is conducive to increasing the heat dissipation area between the transmission housing 310 and the outside on the one hand and facilitates a smooth airflow channel on the other hand. The power tool 100 further includes an air guide hood 800 disposed around the heat conduction and dissipation mechanism 600 and partially or fully overlapping with the heat conduction and dissipation mechanism 600 in an axial direction to guide the airflow of the airflow element of the heat conduction and dissipation mechanism 600 towards the air outlet.

For the power tool 100 in this example, on the one hand, the heat conduction and dissipation mechanism 600 with a good thermal conductivity is in direct contact with the motor shaft and directly disposed on the motor shaft, and the heat generated at the support assembly 410 of the oscillating mechanism 400 is transmitted by heat conduction to the heat conduction and dissipation mechanism 600 through the motor shaft; on the other hand, the airflow element 620 is disposed on the heat conduction and dissipation mechanism 600 and driven by the motor shaft to rotate to generate the airflow, implementing the function of auxiliary heat dissipation. Therefore, the heat conduction and dissipation mechanism 600 in this example has relatively good heat conduction and dissipation performance so that the heat at the support assembly 410 can be transmitted and dissipated in time, thereby improving the cooling efficiency of the support assembly 410 and further improving the service life of the power tool 100.

In addition, for the oscillating power tool, limited by the structure of the whole machine, the distance between the heat conduction and dissipation mechanism 600 and the vibration source cannot be set to be infinitely small, that is, the heat conduction and dissipation mechanism 600 and the vibration source need to be spaced apart by a certain distance. If the distance between the heat conduction and dissipation mechanism 600 and the vibration source is set to be too large, the heat dissipation efficiency with which the heat conduction and dissipation mechanism 600 performs heat dissipation on the vibration source is reduced.

In view of this, referring to FIG. 11, in this example, a portion 610a of the heat conduction and dissipation mechanism 600 in contact with the drive shaft 330 (the motor shaft) has an axial distance L1. In other words, L1 denotes an axial length of the cylindrical heat conducting portion 610. A thermally conductive portion 330a of the drive shaft 330 between the heat conduction and dissipation mechanism 600 and the support assembly 410 has a distance L2. In other words, L2 denotes an axial distance between an axial front end of the cylindrical heat conducting portion 610 and an axial rear end of the bearing 411. The ratio of the axial distance L1 to the distance L2 is greater than or equal to 0.1 and less than or equal to 5, that is, $0.1 \leq L1/L2 \leq 5$. For example, L1 is 2 mm to 20 mm and L2 is 4 mm to 20 mm. The axial length L1 of the portion of the heat conduction and dissipation mechanism 600 in contact with the motor shaft is preferably 8 mm to 20 mm, the axial distance L2 between the axial front end of the cylindrical heat conducting portion 610 and the axial rear end of the bearing 411 is preferably 8 mm to 20 mm, and the ratio of the axial distance L1 to the distance L2 is preferably greater than or equal to 0.5 and less than or equal to 2.5. In this example, the axial length L1 of the portion of the heat conduction and dissipation mechanism 600 in contact with the motor shaft is set to 13 mm, and the axial distance between the axial front end of the cylindrical heat conducting portion 610 and the axial rear end of the bearing 411 is set to 13 mm. That is, in this example, the ratio of the axial distance L1 to the distance L2 is 1.

The relative positions of the heat conduction and dissipation mechanism 600 and the vibration source are set in the preceding manner so that the interference to the vibration source due to too small a distance from the vibration source is avoided, and a heat conduction and dissipation function is prevented from being weakened due to too large a distance from the vibration source. In this manner, on the basis that the performance of the whole machine is not affected, the case where the vibration source fails due to overheating or the working condition is unstable due to overheating is significantly avoided, thereby improving the working stability and reliability of the power tool, improving the service life of the power tool, and improving the user experience.

The heat conduction and dissipation mechanism 600 is provided so that the rotational speed of the motor 320 in this example can be greater than or equal to 15000 rpm. The rotational speed of the motor in this example is 20000 rpm. The rotational speed of the motor may be set to 16000 rpm or 17000 rpm.

As shown in FIG. 10, for the oscillating power tool 100 in this example, the output shaft 510 has an oscillation angle α centered on the output shaft axis 511, and the output shaft 510 oscillates within the oscillation angle α. The heat conduction and dissipation mechanism 600 is provided so that the oscillation angle α of the power tool 100 is greater than or equal to 3°. In this example, the oscillation angle α is 4°, that is, the output shaft 510 oscillates within a range of ±2° on two sides of the output shaft axis 511. α may be set to 5° or set to any value within 3° to 5°. On this basis, the power of the oscillating power tool 100 in this example is allowed to reach up to 500 W.

In this example, the heat conduction and dissipation mechanism is provided so that the oscillating power tool is allowed to work at a higher rotational speed, increasing the cutting speed, the output mechanism is allowed to have a larger oscillation angle, increasing the working power of the oscillating power tool, and the reliability and stability of the oscillating power tool are ensured.

Referring to FIGS. 4 to 6, in the example of the present disclosure, a flow restricting mechanism 630 is further provided, where the flow restricting mechanism 630 is provided within the housing 110 and upstream of the airflow element 620 and filled between the inner wall of the housing and the power mechanism 300 to block an upstream backflow of the cooling airflow. Specifically, the flow restricting mechanism 630 is filled between the inner wall of the housing and an outer circumference of the power housing. The flow restricting mechanism 630 is provided so that the following case can be avoided: the airflow discharged from an axial end of the airflow element 620 flows back to the rear end of the body, causing disturbance to the internal airflow and affecting the smooth movement of the airflow and the cooling effect.

As shown in FIGS. 5 and 6, the flow restricting mechanism 630 in the example of the present disclosure may be a flexible element such as a sponge pad or a rubber pad and may specifically be an annular sponge pad or an annular rubber pad. The flow restricting mechanism 630 may be directly fixed to the outside of the motor housing 340, for example, bonded to an outer circumference of the motor housing 340 through glue. The flow restricting mechanism 630 may be directly fixed to the inner wall of the housing.

As an alternative example, the flow restricting mechanism may be mounted and positioned through a groove or a rib plate provided on the inner wall of the housing and/or on the power housing. For example, the groove or the rib plate into which the flow restricting mechanism is allowed to be clamped is provided on the inner wall of the housing, or the groove or the rib plate into which the flow restricting mechanism is allowed to be clamped is provided on the power housing, or the groove or the rib plate into which the flow restricting mechanism is allowed to be clamped is provided on each of the power housing and the inner wall of the housing, thereby limiting and fixing the flow restricting mechanism.

Further, as another alternative example, the flow restricting mechanism may be a rigid element, such as an annular rib provided on the inner wall of the housing or on the power housing. The annular rib may be provided on each of the inner wall of the housing and the power housing. In this case, two ribs may be configured to be a labyrinth structure for restricting the movement of the airflow.

Referring to FIGS. 5, 7, and 8, the power tool 100 in the example of the present disclosure further includes a shock absorbing mechanism, where the shock absorbing mechanism is provided between the power housing and the inner wall of the housing and used for mitigating or reducing the effect of the vibration of the whole machine in the running process on the power mechanism 300.

Specifically, the shock absorbing mechanism includes multiple damping assemblies in different dimensions, where the multiple damping assemblies separately surround the transmission housing 310 and/or the motor housing 340 and are used for separately damping forces in different directions. Specifically, multiple damping assemblies are separately provided between the power housing and the inner wall of the housing.

The shock absorbing mechanism includes a first-dimensional damping assembly 370 and a second-dimensional damping assembly 380 that are disposed on the transmission housing substantially along directions perpendicular to each other.

The first-dimensional damping assembly 370 includes a shock absorbing damper 371 and a buffer damper 372, where the buffer damper 372 is sleeved on the shock absorbing damper 371, and the shock absorbing damper 371 and the buffer damper 372 are made of different materials, or the shock absorbing damper 371 and the buffer damper 372 may be elastic members with different densities, thereby improving the damping and shock absorbing effect on the lead securing portion 341.

The second-dimensional damping assembly 380 includes the shock absorbing damper 371. As an alternative example, the second-dimensional damping assembly 380 may be configured to include the shock absorbing damper 371 and the buffer damper 372, where the buffer damper 372 is sleeved on the shock absorbing damper 371.

Specifically, in the example of the present disclosure, as shown in FIG. 5, at least one second-dimensional damping assembly 380 is provided on the outer circumference of the transmission housing 310. When multiple second-dimensional damping assemblies 380 are provided, the multiple second-dimensional damping assemblies 380 are distributed on the outer circumference of the transmission housing 310 substantially along a direction parallel to the motor axis. It is to be understood that multiple second-dimensional damping assemblies 380 are provided on the left and right sides of the body, where the second-dimensional damping assemblies 380 on the two sides are substantially symmetrical about the middle plane 101.

As shown in FIGS. 7 and 8, the power tool 100 in the example of the present disclosure further includes a damping assembly provided on the outer circumference of the motor housing 340. Specifically, the damping assembly constitutes an external shock absorbing assembly on the outer circumference of the motor housing 340, where the external shock absorbing assembly may include multiple damping assemblies in different dimensions, and the multiple damping assemblies separately surround an outer circumference of the lead securing portion 341 and are used for separately damping forces in different directions.

Specifically, the external shock absorbing assembly in this example includes the first-dimensional damping assembly 370 and the second-dimensional damping assembly 380 that are disposed on the outer circumference of the lead securing portion 341 of the motor housing 340 substantially along directions perpendicular to each other. Specifically, the first-dimensional damping assembly 370 is disposed on the outer circumference of the lead securing portion 341 substantially along an up and down direction and the second-dimensional damping assembly 380 is disposed on the outer circumference of the lead securing portion 341 substantially along the left and right direction.

The external shock absorbing assembly may be provided at other positions on the outer circumference of the motor housing 340 in addition to the outer circumference of the lead securing portion 341.

Referring to FIGS. 12 to 15, the power tool 100 in the present disclosure further includes a fitting device 900, where the fitting device 900 include a fitting 910 and a fitting clamp 920, and the fitting clamp 920 is used for mounting and fixing the fitting 910 to the transmission housing 310. Alternatively, the fitting 910 may be mounted to another position of the tool body 100a, for example, the housing 110 or the power mechanism 300.

The fitting clamp 920 includes a clamp body 921, a fitting mounting portion 922a, and a fastening assembly 924a.

Figure 17:
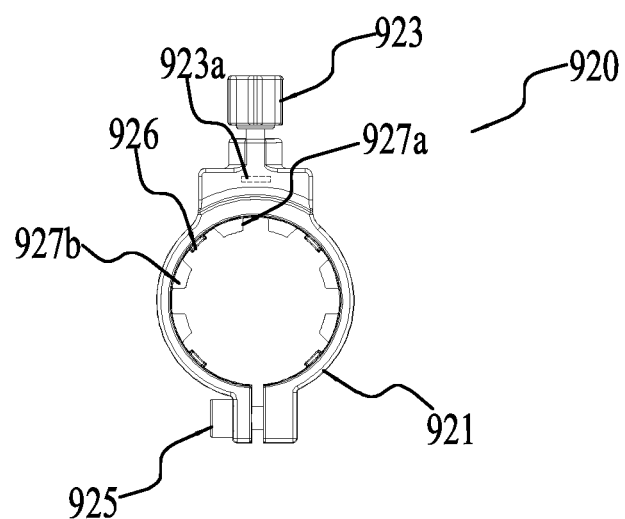
FIG. 17 is a structural view of a fitting clamp in the present disclosure.

As shown in FIG. 17, the clamp body 921 is an annular hoop, where the annular hoop is provided around the outer circumference of the transmission housing 310, and the annular hoop is used for mounting the fitting 910 assisting the working attachment in working.

As shown in FIGS. 12 to 17, the fitting mounting portion 922a is used for fixing and mounting the fitting 910. Specifically, the fitting mounting portion 922a includes a through hole 922 disposed on the clamp body 921 and a fixing member 923 for fixing and locking the fitting 910 in the through hole 922, where the fixing member 923 mates with a fixing hole disposed on a sidewall of the through hole 922, and the fixing hole communicates with the through hole 922. For example, the fixing member 923 is a knob or bolt, the fixing member 923 is threadedly connected to the fixing hole, and an end of the fixing member 923 enters the through hole 922 to fix and lock the fitting 910.

Further, a non-slip mat 923a is provided on an abutting surface between the fixing member 923 and the fitting 910 to prevent the fitting 910 from loosening and falling off. For example, the non-slip mat 923a may be provided on an inner circumference of the through hole 922, or the non-slip mat 923a may be provided at the end of the fixing member 923. The non-slip mat 923a may be made of a rubber material. The arrangement manner and material of the non-slip mat 923a are not limited as long as the frictional resistance between the fixing member 923 and the fitting 910 is increased.

Further, an operating portion 912 is provided with a locking plane 912b mating with the fixing member 923 to lock the operating portion 912, and the end of the fixing member 923 abuts against the locking plane 912b to fix and lock the operating portion 912 in the through hole.

As shown in FIGS. 12 to 17, the fastening assembly 924a in the example of the present disclosure is used for fixing and locking the clamp body 921 to the transmission housing 310. Specifically, the fastening assembly 924a includes connecting holes 924 at two corresponding ends of the annular hoop and a retaining member 925 threadedly mating with the connecting holes 924. The annular hoop is locked and fixed to the transmission housing 310 by the retaining member 925.

Figure 12:
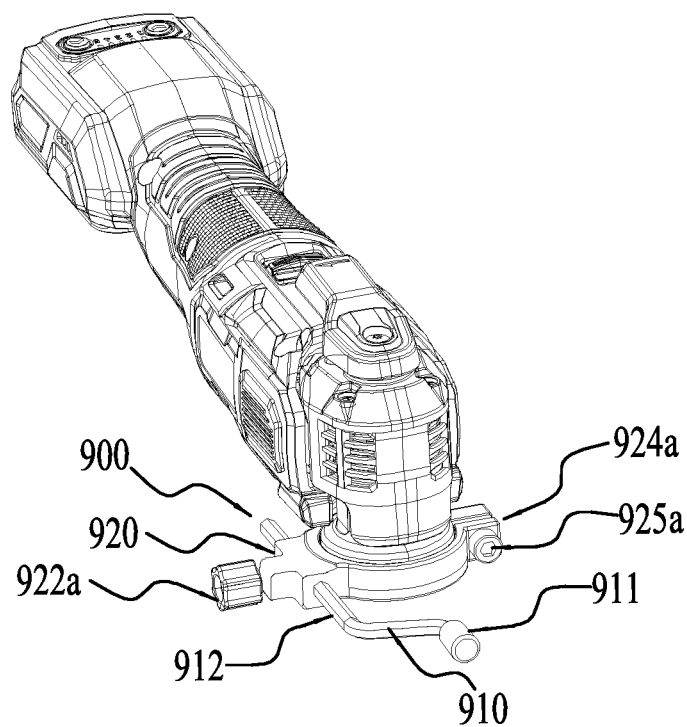
FIG. 12 is a structural view of the assembly of a fitting and a power tool in the present disclosure.
Figure 14:
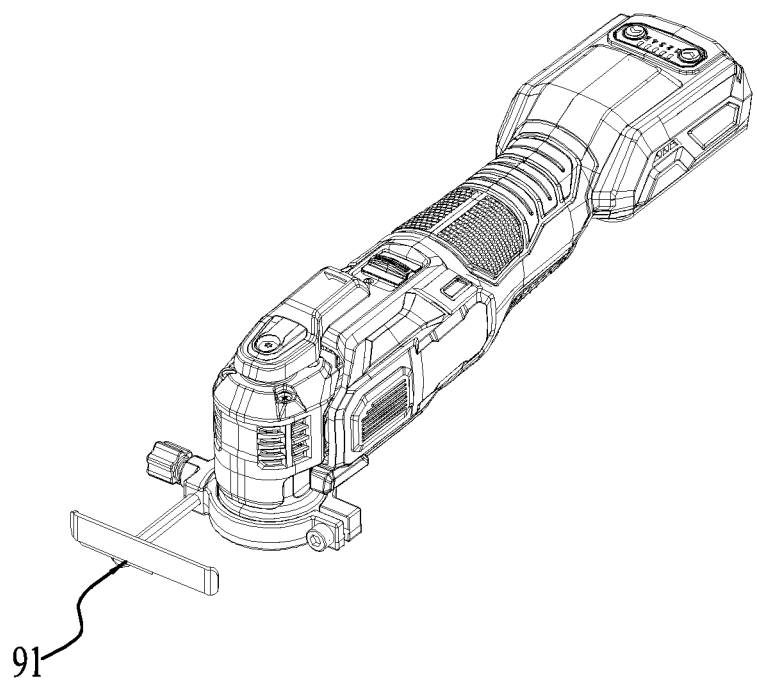
FIG. 14 is a structural view of the assembly of another fitting and a power tool in the present disclosure.
Figure 15:
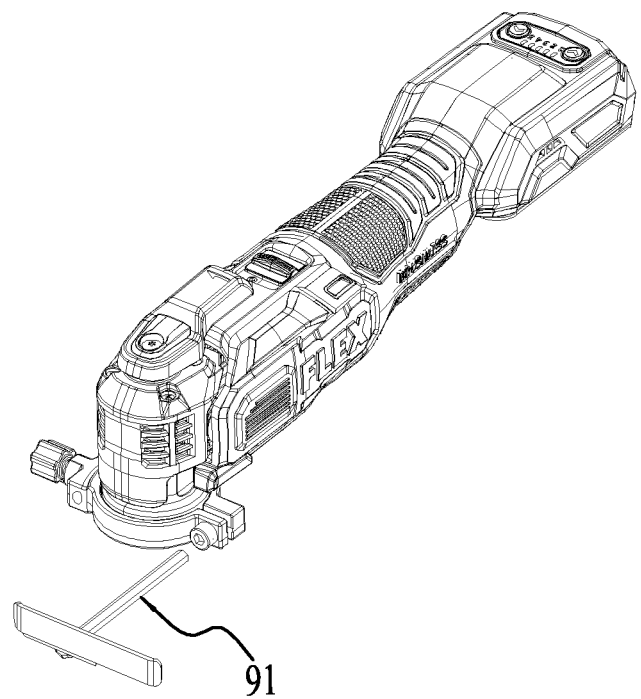
FIG. 15 is a schematic view of the assembly and disassembly of a fitting clamp with another fitting of a power tool in the present disclosure.
Figure 16:
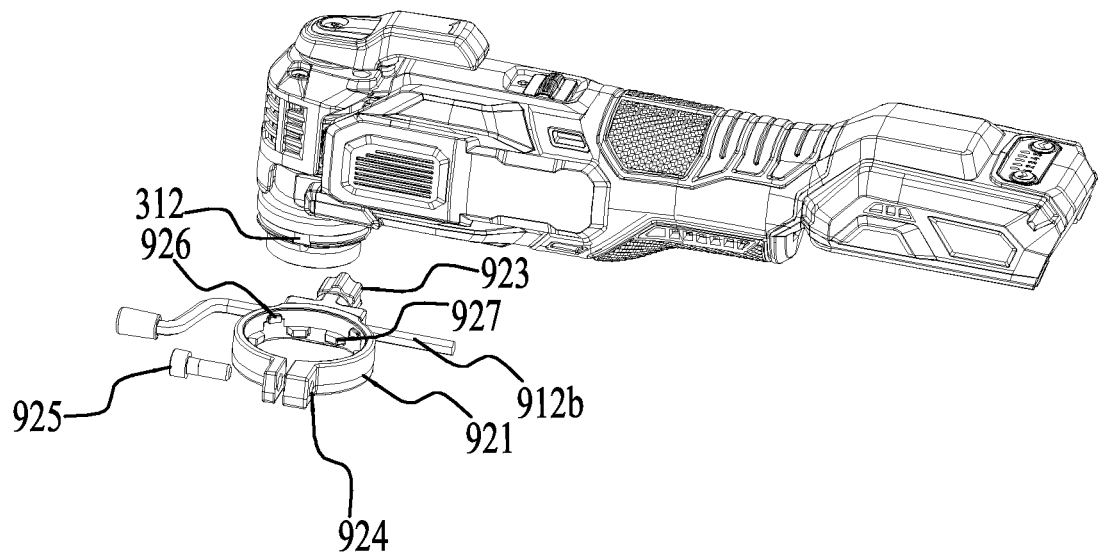
FIG. 16 is a schematic view of the assembly of a fitting clamp of a power tool in the present disclosure.

The fitting 910 in this example is a depth gauge shown in FIG. 12, and the fitting 910 includes a tool portion 911 and the operating portion 912, where the tool portion 911 is used for implementing functions such as guiding and depth guidance, and the operating portion 912 is used for driving the fastening assembly 924a to lock the clamp body 921. The operating portion 912 is fixed to the fitting mounting portion 922a when the fitting is in use, and the end of the fixing member 923 may penetrate through the fixing hole into the through hole 922 and abut against the operating portion 912 so as to abut against and lock the operating portion 912. Alternatively, as shown in FIGS. 14 and 15, the fitting may be a guide gauge 91. The tool portion 911 is used for implementing the function of the fitting. In this example, the tool portion 911 is used for implementing a depth adjustment function, and the fitting 910 can adjust the cutting depth of the power tool 100. When the fitting is the guide gauge 91, the tool portion is used for being in contact with a workpiece and implementing a guiding function, and the fitting can guide the power tool to move along a surface of the workpiece.

Figure 13:
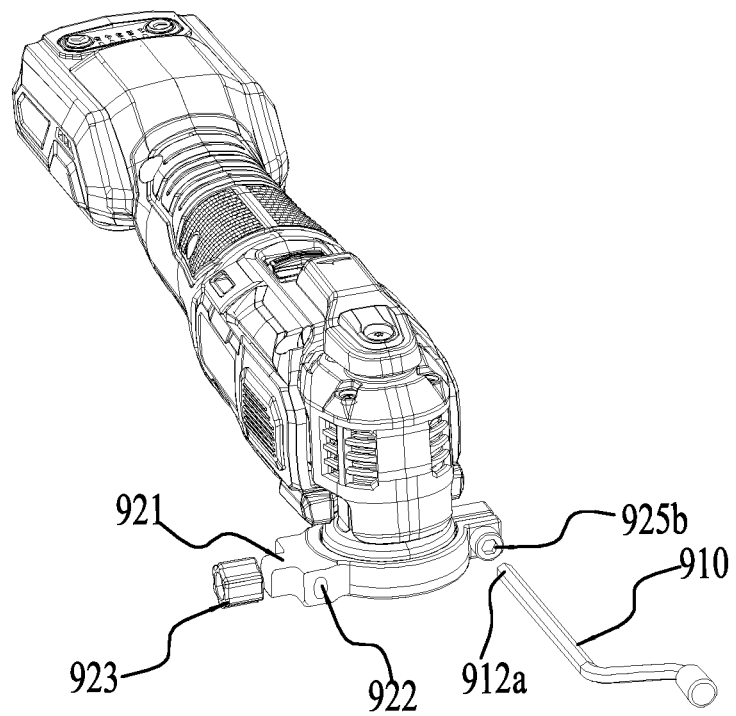
FIG. 13 is a schematic view of the assembly and disassembly of a fitting clamp with a fitting of a power tool in the present disclosure.

As shown in FIG. 13, the retaining member 925 further includes a torque transmission hole 925a, where the torque transmission hole 925a is a non-circular hole and includes at least a straight side 925b for transmitting torque. An end of the operating portion 912 may be inserted into the torque transmission hole 925a to perform locking and unlocking operations. Specifically, the operating portion 912 includes a torque transmission plane 912a mating with the straight side 925b.

Specifically, the retaining member 925 in the example of the present disclosure is a socket head cap screw, that is, the torque transmission hole is a hexagonal counterbore hole, and the corresponding operating portion 912 is a hexagonal prism. In this case, no additional machining is required to form the torque transmission plane, and any face of the hexagonal prism of the operating portion 912 may form the locking plane 912b mating with the fixing member 923.

As another alternative example, the torque transmission hole may be configured to be, for example, a rectangular hole, a triangular hole, a semicircular hole, or another special-shaped hole, and the corresponding operating portion 912 of the fitting 910 may be configured to be a rectangular prism, a triangular prism, a semi-cylinder, or another non-cylinder as long as the torque transmission hole includes the straight side for transmitting torque and the operating portion includes the plane mating with the straight side and used for transmitting torque.

Generally, the operating portion of the fitting of the existing power tool is configured to be a cylinder, the cylindrical operating portion has the problem that the operating portion fixed in the through hole by the fixing member easily slips and rotates, and the retaining member in the fitting clamp needs to be opened or locked by an external tool such as a hexagonal wrench.

As shown in FIGS. 12 to 16, in the example of the present disclosure, the operating portion 912 of the fitting 910 is configured to be the hexagonal prism. On the one hand, the hexagonal prism is a conventional and easily accessible raw material part, and the socket head cap screw or a socket head cap bolt is also a conventional and easily accessible connector in the art. Therefore, the retaining member 925 does not need to be additionally machined to form the torque transmission hole, and the operating portion 912 does not need to be additionally machined to form the torque transmission plane 912a and the locking plane 912b on the surface of the operating portion 912. On the basis of simplifying a machining process and reducing the labor and cost, the reliability of the assembly of the fitting is improved, the operation difficulty of the fitting clamp is reduced, and the user experience is improved. As shown in FIG. 17, in the example of the present disclosure, the fitting clamp 920 further includes limiting members 926 disposed on an inner circumferential surface of the clamp body 921. For example, the limiting members 926 may be multiple protrusions disposed on the inner circumferential surface of the clamp body 921, and the transmission housing 310 includes positioning grooves 312 allowing the limiting members 926 to axially enter and exit. When mounted, the fitting clamp 920 is inserted from an axial end of the transmission housing 310 so that the limiting members 926 are inserted into the positioning grooves 312, thereby achieving the initial positioning of the fitting clamp 920 during assembly.

In the example of the present disclosure, the fitting clamp 920 further includes multiple diagonal members 927 disposed on the inner circumferential surface of the clamp body 921. For example, the diagonal members 927 may be multiple pairs of bosses disposed on the inner circumferential surface of the clamp body 921, and a middle line of one pair of bosses is used for reflecting the corresponding scale. The diagonal members 927 and the limiting members 926 are axially spaced apart from each other on the inner circumferential surface of the clamp body 921. The diagonal members 927 are used for identifying an installation angle at which the fitting clamp 920 is mounted to the transmission housing 310.

Specifically, multiple diagonal members 927 are provided and include, for example, a 0° diagonal member 927a for showing that the fitting clamp 920 is at a 0° angle relative to the transmission housing 310 as shown in FIG. 17 and a vertical diagonal member 927b for showing that the fitting clamp 920 is perpendicular to the transmission housing 310. Angles showed by the diagonal members are not limited to the above two. For example, a 45° diagonal member, a 60° diagonal member, and the like may also be provided.

When the fitting 910 needs to be used to guide the cutting depth of the power tool 100, the clamp body 921 is sleeved on the tool body 100a, the operating portion 912 of the fitting 910 drives the fastening assembly 924a so that the clamp body 921 is locked to the tool body 100a, and then the fitting 910 is mounted to the fitting mounting portion 922a. At this time, the fitting 910 may guide the power tool 100 to cut the workpiece at different depths. When the fitting 910 does not need to be used, the user may detach the fitting 910 from the fitting mounting portion 922a and then drive the fastening assembly 924a through the operating portion 912 so as to loosen the clamp body 921. In this manner, the fitting 910 can implement both the function of the fitting 910 and the function of locking or loosening the clamp body 921 and will not be lost, which is convenient for the user to operate.

The above illustrates and describes basic principles, main features, and advantages of the present disclosure. It is to be understood by those skilled in the art that the preceding examples do not limit the present disclosure in any form, and technical solutions obtained through equivalent substitutions or equivalent transformations fall within the scope of the present disclosure.

What is claimed is:

1. A power tool, comprising:
a housing;
a power mechanism comprising a rotatable drive shaft;
an oscillating mechanism for generating oscillations;
an output mechanism drivingly connected to the oscillating mechanism;
an airflow element connected to the drive shaft and driven by the drive shaft to rotate to generate an airflow;
a heat conducting portion supported on the drive shaft, wherein the airflow element is disposed on an outer circumference of the heat conducting portion;
an air inlet disposed on the housing and allowing the airflow to enter; and
an air outlet disposed on the housing and downstream of the air inlet and allowing the airflow to flow out;
wherein the oscillating mechanism comprises:
a support assembly sleeved on the drive shaft; and
an oscillating member driven by the support assembly to oscillate; and
wherein heat generated by the oscillating mechanism is conducted to the heat conducting portion through the drive shaft, the heat conducting portion has a thermal conductivity greater than or equal to 50 W/m·° C., a portion of the heat conducting portion in contact with the drive shaft has an axial distance L1, a thermally conductive portion of the drive shaft between the heat conducting portion and the support assembly has a distance L2, and a ratio of the axial distance L1 to the distance L2 is greater than or equal to 0.1 and less than or equal to 5,
further comprising an oil storage unit used for storing a lubricating medium and disposed on at least one of the drive shaft or the support assembly, wherein the support assembly comprises a support bracket and rolling members, and oil grooves penetrating through a circumferential surface of the support bracket are provided on the support bracket.

2. The power tool of claim 1, further comprising a flow restricting mechanism disposed within the housing and upstream of the airflow element, wherein the flow restricting mechanism is filled between an inner wall of the housing and the power mechanism to prevent the airflow from flowing upstream.

3. The power tool of claim 2, wherein the power mechanism comprises a power housing, and the flow restricting mechanism is filled between an outer circumference of the power housing and the inner wall of the housing.

4. The power tool of claim 2, wherein the flow restricting mechanism is a flexible element.

5. The power tool of claim 1, wherein the oil storage unit comprises an oil groove disposed on the drive shaft.

6. The power tool of claim 1, wherein the power mechanism further comprises a motor housing, the drive shaft is at least partially disposed within the motor housing, and the motor housing is connected to a lead securing mechanism for securing motor wires.

7. The power tool of claim 6, wherein a lead channel allowing the motor wires to penetrate through is formed in the lead securing mechanism.

8. The power tool of claim 7, wherein the motor housing further comprises an internal shock absorber that allows the motor wires to penetrate through and is embedded in the lead channel.

9. The power tool of claim 1, wherein the output mechanism comprises an output shaft for outputting power, and an axis of the output shaft is perpendicular to an axis of the drive shaft.

10. The power tool of claim 1, wherein the housing comprises a first housing for accommodating at least part of the output mechanism and a second housing formed with a grip for a user to hold, the second housing extends horizontally, and the power mechanism comprises a motor disposed horizontally within the second housing.

11. The power tool of claim 10, wherein the drive shaft is integrally formed with a motor shaft of the motor.

12. The power tool of claim 11, wherein the power mechanism comprises a transmission housing, a plurality of guide ribs corresponding to the airflow element are provided on an outer wall of the transmission housing, and a guide channel is formed between two adjacent ones of the plurality of guide ribs.

13. The power tool of claim 1, wherein the axial distance L1 of the portion of the heat conducting portion in contact with the drive shaft is greater than or equal to 2 mm and less than or equal to 20 mm.

14. The power tool of claim 1, wherein the distance L2 of the thermally conductive portion of the drive shaft between the heat conducting portion and the support assembly is greater than or equal to 2 mm and less than or equal to 20 mm.

15. The power tool of claim 1, wherein the ratio of the axial distance L1 to the distance L2 is greater than or equal to 0.5 and less than or equal to 2.5.

16. The power tool of claim 15, wherein the power mechanism comprises a motor having a rotational speed greater than or equal to 15000 rpm.

17. The power tool of claim 16, wherein an output shaft has an oscillation angle $\alpha$ centered on an axis of the output shaft, and the oscillation angle $\alpha$ is greater than or equal to 3°.

18. A power tool, comprising:
a housing;
a power mechanism comprising a rotatable drive shaft;
an oscillating mechanism for generating oscillations;
an output mechanism drivingly connected to the oscillating mechanism;
an airflow element connected to the drive shaft and driven by the drive shaft to rotate to generate an airflow;
a heat conducting portion supported on the drive shaft, wherein the airflow element is disposed on an outer circumference of the heat conducting portion;
an air inlet disposed on the housing and allowing the airflow to enter; and
an air outlet disposed on the housing and downstream of the air inlet and allowing the airflow to flow out;
wherein the oscillating mechanism comprises:
a support assembly sleeved on the drive shaft; and
an oscillating member driven by the support assembly to oscillate; and
wherein heat generated by the oscillating mechanism is conducted to the heat conducting portion through the drive shaft, and the heat conducting portion has a thermal conductivity greater than or equal to 50 W/m·° C., the support assembly comprises a support bracket and rolling members, and oil grooves penetrating through a circumferential surface of the support bracket are provided on the support bracket.

* * * * *